(12) United States Patent
Ahn et al.

(10) Patent No.: US 12,510,599 B2
(45) Date of Patent: Dec. 30, 2025

(54) APPARATUS FOR MEASURING INTERNAL RESISTANCE OF BATTERY CELLS IN VARIABLE NUMBER UNIT IN ONLINE STATE

(71) Applicant: KOREA ELECTRONICS TECHNOLOGY INSTITUTE, Seongnam-si (KR)

(72) Inventors: Junghoon Ahn, Jeollanam-do (KR); Sunggeun Song, Gwangju (KR); Byungchul Park, Gwangju (KR); Kyoochang Jeong, Gwangju (KR); Seongmun Oh, Gwangju (KR)

(73) Assignee: Korea Electronics Technology Institute, Seongnam-si (KR)

( * ) Notice: Subject to any disclaimer, the term of this patent is extended or adjusted under 35 U.S.C. 154(b) by 461 days.

(21) Appl. No.: 18/058,191

(22) Filed: Nov. 22, 2022

(65) Prior Publication Data

US 2023/0160968 A1   May 25, 2023

(30) Foreign Application Priority Data

Nov. 22, 2021 (KR) .......................... 1020210161635
Nov. 16, 2022 (KR) .......................... 1020220154050

(51) Int. Cl.
*G01R 31/389* (2019.01)
*G01R 31/3842* (2019.01)

(52) U.S. Cl.
CPC ....... *G01R 31/389* (2019.01); *G01R 31/3842* (2019.01)

(58) Field of Classification Search
CPC ............. G01R 31/389; G01R 31/3842; G01R 31/396; G01R 19/16576; G01R 19/16542; G01R 27/08; H02J 7/0047

(Continued)

(56) References Cited

U.S. PATENT DOCUMENTS

2010/0161259 A1* 6/2010 Kim ................... G05B 23/0283
324/120

FOREIGN PATENT DOCUMENTS

JP       2012-167978 A      9/2012
KR   10-2017-0111881          10/2017

(Continued)

OTHER PUBLICATIONS

English translation of KR-20210129340, Oct. 28, 2021. (Year: 2021).*

(Continued)

*Primary Examiner* — Michael P Nghiem
(74) *Attorney, Agent, or Firm* — Knobbe, Martens, Olson & Bear, LLP

(57) ABSTRACT

An apparatus for measuring the internal resistance of battery cells in a variable number unit in an online state is proposed. The apparatus may include a switch array, a variable resistor, a high-speed switch, a measurement sensor, and a controller. The switch array configures a measurement target battery cell by selecting at least one battery cell from among a plurality of battery cells included in a battery module. The variable resistor is connected to the measurement target battery cell via the switch array. The high-speed switch switches a connection between the measurement target battery cell and the variable resistor. The measurement sensor detects a measurement voltage of the measurement target battery cell and a measurement current of the measurement target battery cell in an online state of the battery module. The controller derives an internal resistance of the measurement target battery cell through the measurement voltage and the measurement current.

6 Claims, 12 Drawing Sheets

(58) Field of Classification Search
USPC .......................................................... 702/63
See application file for complete search history.

(56) References Cited

FOREIGN PATENT DOCUMENTS

| KR | 20210129340 A | * | 10/2021 | ......... G01R 31/3842 |
| KR | 10-2019-0088153 A | | 9/2022 | |
| KR | 10-2017-0084608 A | | 4/2023 | |

OTHER PUBLICATIONS

Office Action received in Korean Application No. 10-2022-0154050 dated Mar. 20, 2024 in 10 pages.
Notice of Allowance received in Korean Patent Application No. 10-2022-0154050 dated Aug. 29, 2024 in 11 pages.

* cited by examiner

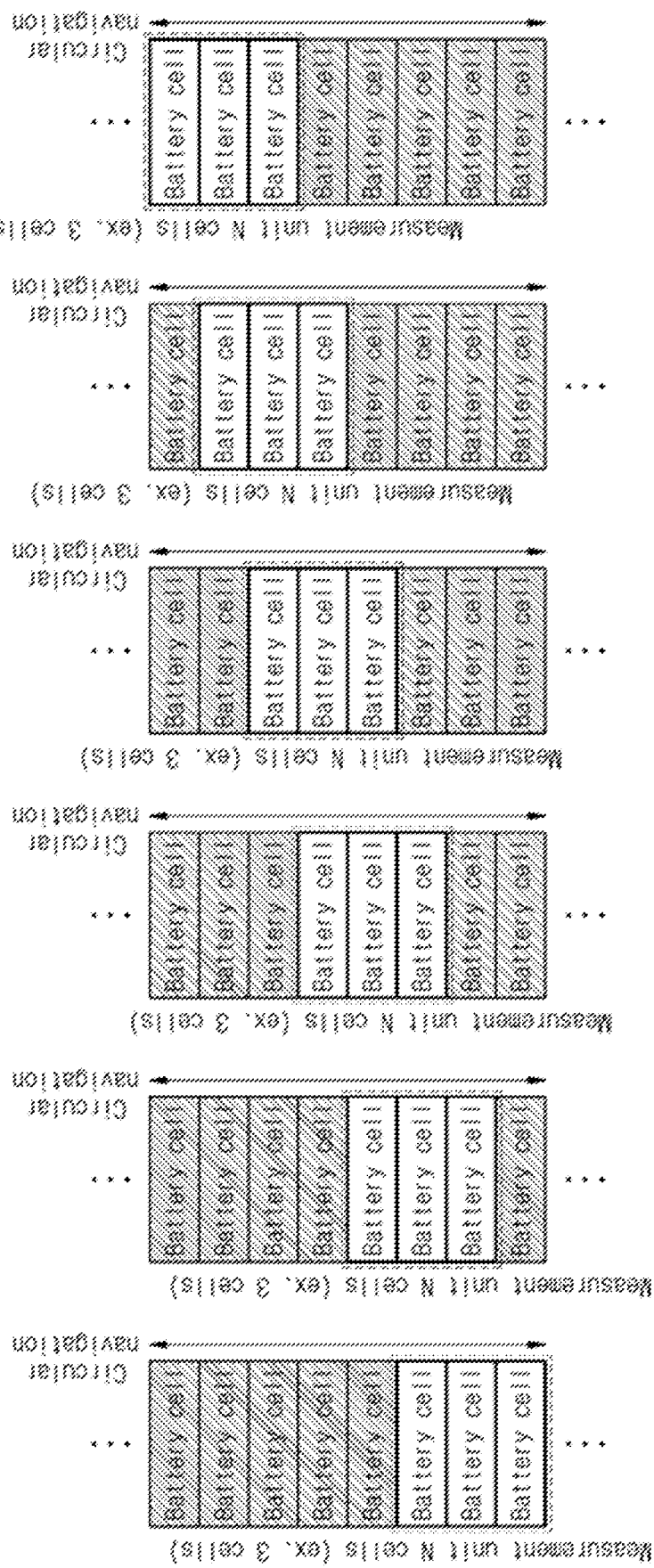

| Battery #1 | Battery #2 | Battery #3 | Battery #4 | Battery #5 | Battery #6 | Battery #7 (Anomaly cell) | Battery #8 | Battery #9 |

Possible to check whether there is problem, impossible to specify problematic cell

FIG. 9

| Battery #1 | Battery #2 | Battery #3 | Battery #4 | Battery #5 | Battery #6 | Battery #7 (Anomaly cell) | Battery #8 | Battery #9 |
|---|---|---|---|---|---|---|---|---|
| Measurement trial 1 | Measurement trial 2 | Measurement trial 3 | Measurement trial 4 | Measurement trial 5 | Measurement trial 6 | Measurement trial 7 | Measurement trial 8 | Measurement trial 9 |

(Check whether there is problem. Specify problematic cell)

FIG. 10

APPARATUS FOR MEASURING INTERNAL RESISTANCE OF BATTERY CELLS IN VARIABLE NUMBER UNIT IN ONLINE STATE

CROSS-REFERENCE TO RELATED APPLICATION

The present application claims priority to Korean Patent Application No. 10-2021-0161635 filed on Nov. 22, 2021 and Korean Patent Application No. 10-2022-0154050 filed on Nov. 16, 2022 in the Korean Intellectual Property Office, both of which are incorporated herein in their entirety by reference.

BACKGROUND

Technical Field

The present disclosure relates to a technique for measuring the internal resistance of a battery cell, and more particularly, to an apparatus for measuring the internal resistance of battery cells in a variable number unit in an online state (e.g., while the battery cells are in operation).

Description of Related Technology

Once a large-capacity battery used in various electrical applications catches fire, it is not extinguished until the entire energy is consumed, so there is a risk of increasing property and human damage. There are various methodologies for the safe use of batteries, but remembering that there are reports of fires and the like despite normal use of batteries, it can be seen that careful and continuous management is required for the aging (health) state of batteries.

SUMMARY

One aspect is an apparatus for measuring the internal resistance of battery cells in a variable number unit in an online state.

Another aspect is a cell internal resistance online measuring apparatus that may include a switch array configuring a measurement target battery cell by selecting at least one battery cell from among a plurality of battery cells included in a battery module; a variable resistor connected to the measurement target battery cell via the switch array; a high-speed switch switching a connection between the measurement target battery cell and the variable resistor; a measurement sensor detecting a measurement voltage of the measurement target battery cell and a measurement current of the measurement target battery cell in an online state of the battery module; and a controller deriving an internal resistance of the measurement target battery cell through the measurement voltage and the measurement current.

The measurement sensor may detect a variation in the measurement voltage of the measurement target battery cell depending on switching of the high-speed switch and detect the measurement current of the measurement target battery cell in a switch-on state of the high-speed switch. The controller may divide the measurement voltage variation by the measurement current to calculate the internal resistance of the measurement target battery cell.

The controller may derive, as the measurement voltage variation, a voltage difference of the measurement target battery cell between timings immediately before and immediately after the high-speed switch changes from a switch-off state to the switch-on state.

The apparatus may further include a switch array controller configuring the measurement target battery cell by controlling the switch array, variably changing a unit of measurement indicating the number of selected battery cells upon configuring the measurement target battery cell, and determining a measurement order indicating an order of configuring the measurement target battery cell.

The controller may derive the internal resistance of all battery cells in the battery module through the measurement circuit by using a first unit of measurement, and then notify the measurement target battery cell having an abnormality to the switch array controller. The switch array controller may change a unit of measurement to a second unit of measurement smaller than the first unit of measurement, and change a measurement order to measure the measurement target battery cell having an abnormality.

The controller may measure an average voltage of all battery cells in the battery module. When a voltage of the measurement target battery cell is less than the average voltage, the controller may increase a duty ratio of the high-speed switch so that battery energy consumed by the variable resistor increases, and when the voltage of the measurement target battery cell is greater than or equal to the average voltage, the controller may decrease the duty rate of the high-speed switch so that the battery energy consumed by the variable resistor is reduced.

The controller may measure an average voltage of all battery cells in the battery module. When a voltage of the measurement target battery cell is less than the average voltage, the controller may increase a resistance value of the variable resistor so that battery energy consumed by the variable resistor increases, and when the voltage of the measurement target battery cell is greater than or equal to the average voltage, the controller may decrease the resistance value of the variable resistor so that the battery energy consumed by the variable resistor is reduced.

According to the present disclosure, it is possible to measure the battery internal resistance even when the battery is in operation, i.e., even in the online state. In addition, according to the present disclosure, it is possible to freely and automatically adjust the number of cells used as a unit of measurement ranging from battery cells to modules and packs. Therefore, it is possible to sequentially and quickly check the state of the entire battery in a large unit of cells, and to specify an abnormal battery cell having an abnormally high or low internal resistance by performing a detailed analysis in a small unit of cells. Accordingly, safety accidents such as fire can be prevented in advance by effectively tracking changes in the internal health state of the battery during use of the large-capacity battery. Also, the present disclosure can perform cell balancing by actively measuring and reducing an unbalanced state between battery cells while measuring the internal resistance of the battery. Accordingly, the life of the battery can be increased.

BRIEF DESCRIPTION OF THE DRAWINGS

FIGS. 4A to 6 are diagrams illustrating the measurement timing for measuring the internal resistance of a battery cell according to an embodiment of the present disclosure.

FIGS. 7A to 11 are diagrams illustrating a method of configuring measurement target battery cells according to an embodiment of the present disclosure.

DETAILED DESCRIPTION

Figure 1:
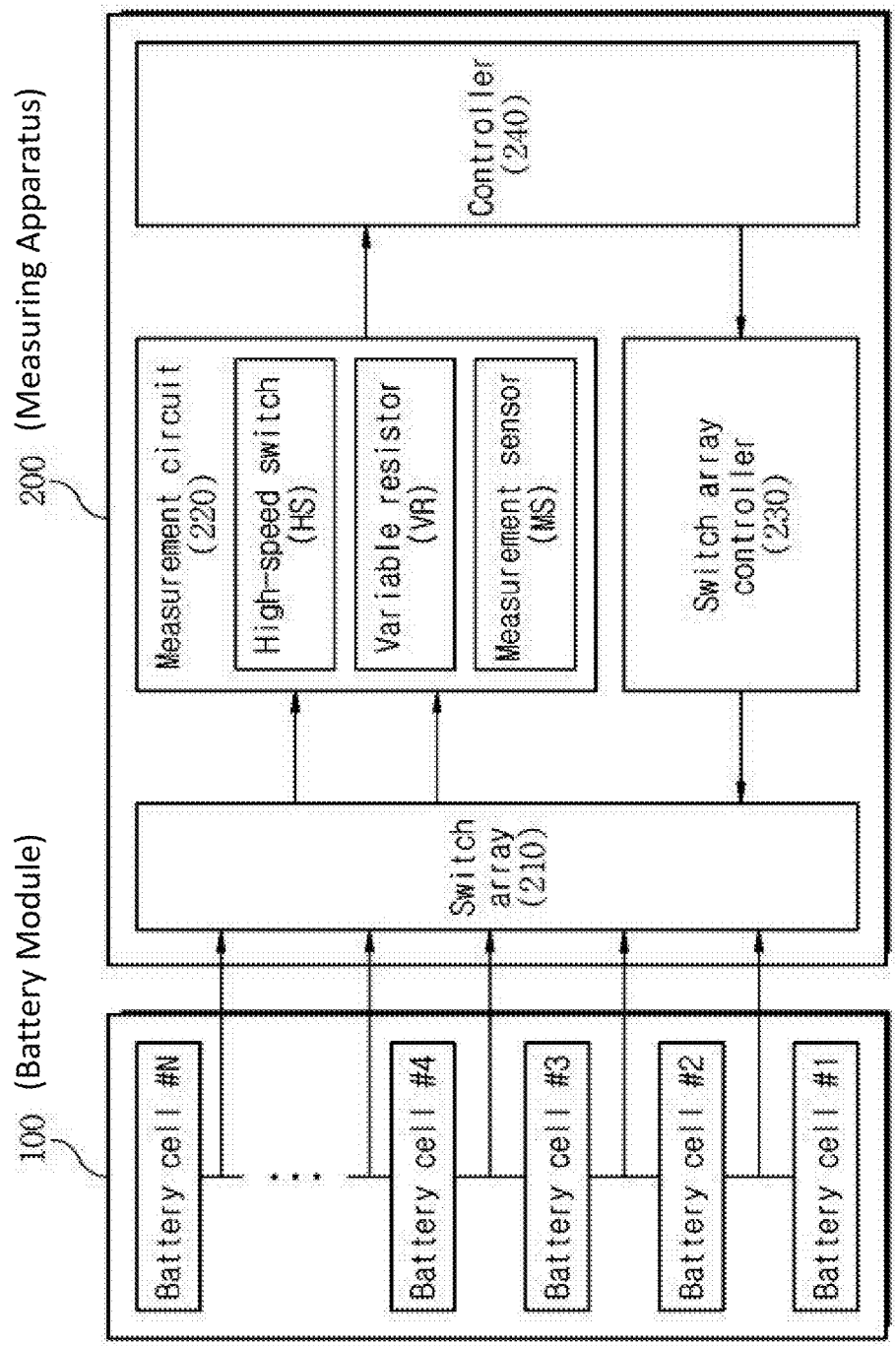
FIG. 1 is a diagram illustrating the configuration of an apparatus for measuring the internal resistance of battery cells in a variable number unit in an online state according to an embodiment of the present disclosure.

A representative parameter closely related to the health state of a battery is the battery's internal resistance. In general, the battery internal resistance is measured through measurement equipment in an offline state such as before the battery is installed in a product or after it is removed from a product, not in a state where the battery is installed in the product, so it is difficult to measure the internal resistance or manage its trend during operation.

A large-capacity battery module is composed of a series-parallel combination of a plurality of battery cells. If a problem occurs in even one cell, the problem spreads to the entire battery module. In the case of a device that comprehensively measures the internal resistance of the entire large-capacity battery module, it is difficult to specify the most problematic battery cell, and in the case of a device that measures the internal resistance of a battery cell, it is inefficient to connect such devices to all cells.

In addition, devices for measuring the battery internal resistance are difficult to apply in an online situation because of not interfering with or contributing to the operation of the battery, such as injecting a current or voltage of a specific frequency.

Now, embodiments of the present disclosure will be described in detail with reference to the accompanying drawings.

However, in the following description and the accompanying drawings, well known techniques may not be described or illustrated in detail to avoid obscuring the subject matter of the present disclosure. Through the drawings, the same or similar reference numerals denote corresponding features consistently.

The terms and words used in the following description, drawings and claims are not limited to the bibliographical meanings thereof and are merely used by the inventor to enable a clear and consistent understanding of the disclosure. Thus, it will be apparent to those skilled in the art that the following description about various embodiments of the present disclosure is provided for illustration purpose only and not for the purpose of limiting the disclosure as defined by the appended claims and their equivalents.

Figure 2A:
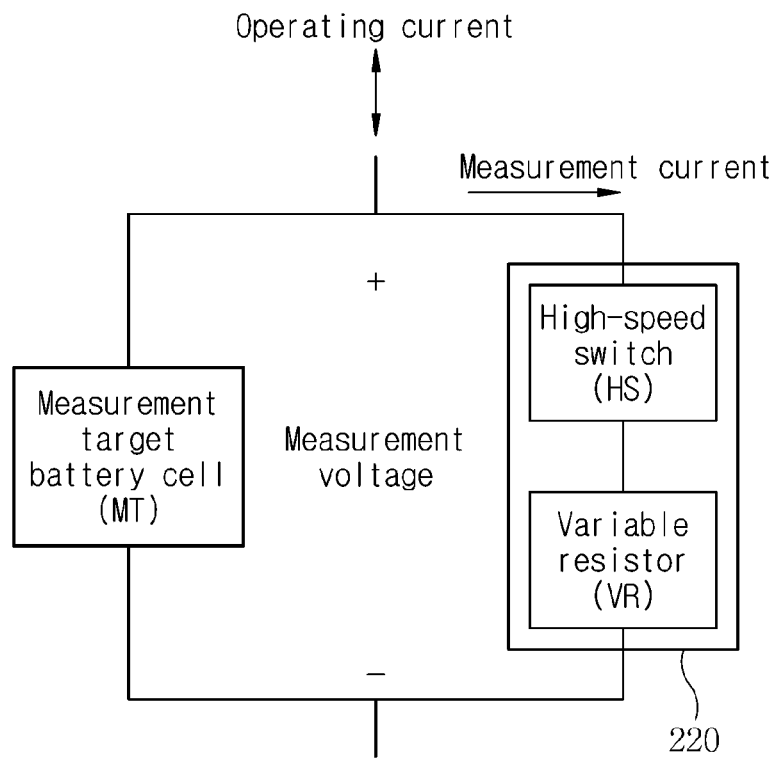
FIGS. 2A and 2B are diagrams illustrating the configuration of a measurement circuit for measuring the internal resistance of a battery cell according to an embodiment of the present disclosure.
Figure 2B:
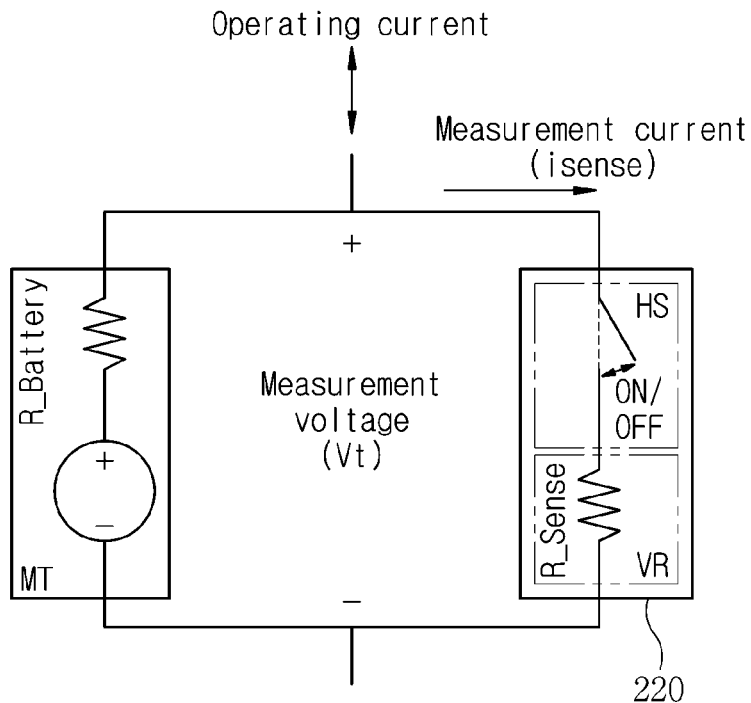
Figure 3:
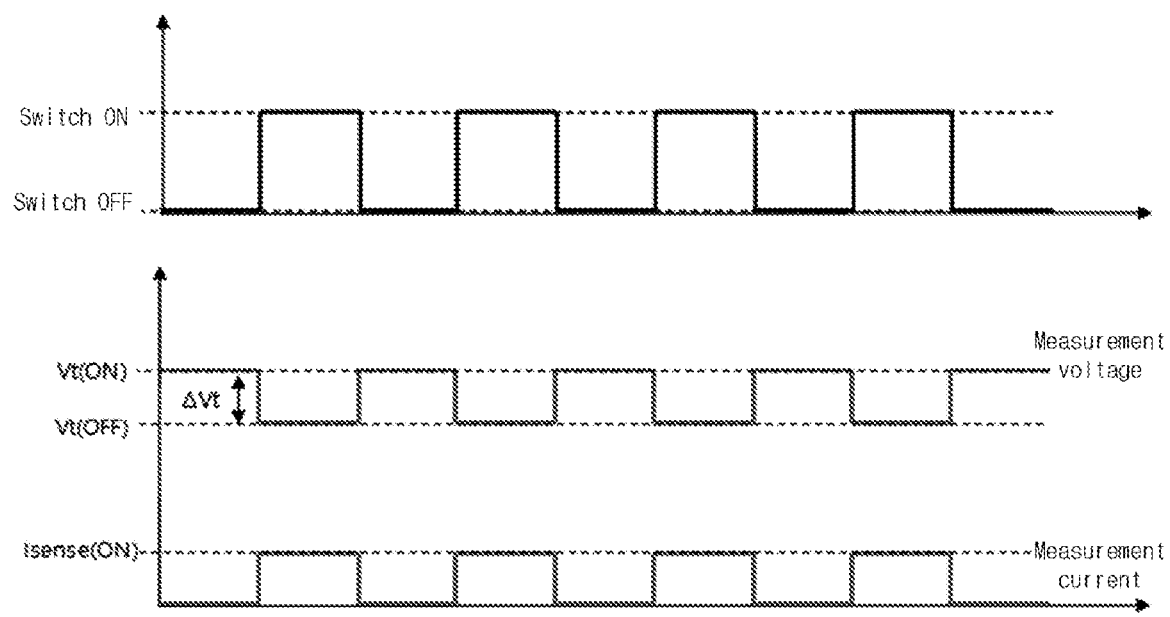
FIG. 3 is a diagram illustrating the waveform of an operation for measuring the internal resistance of a battery cell according to an embodiment of the present disclosure.
Figure 4:
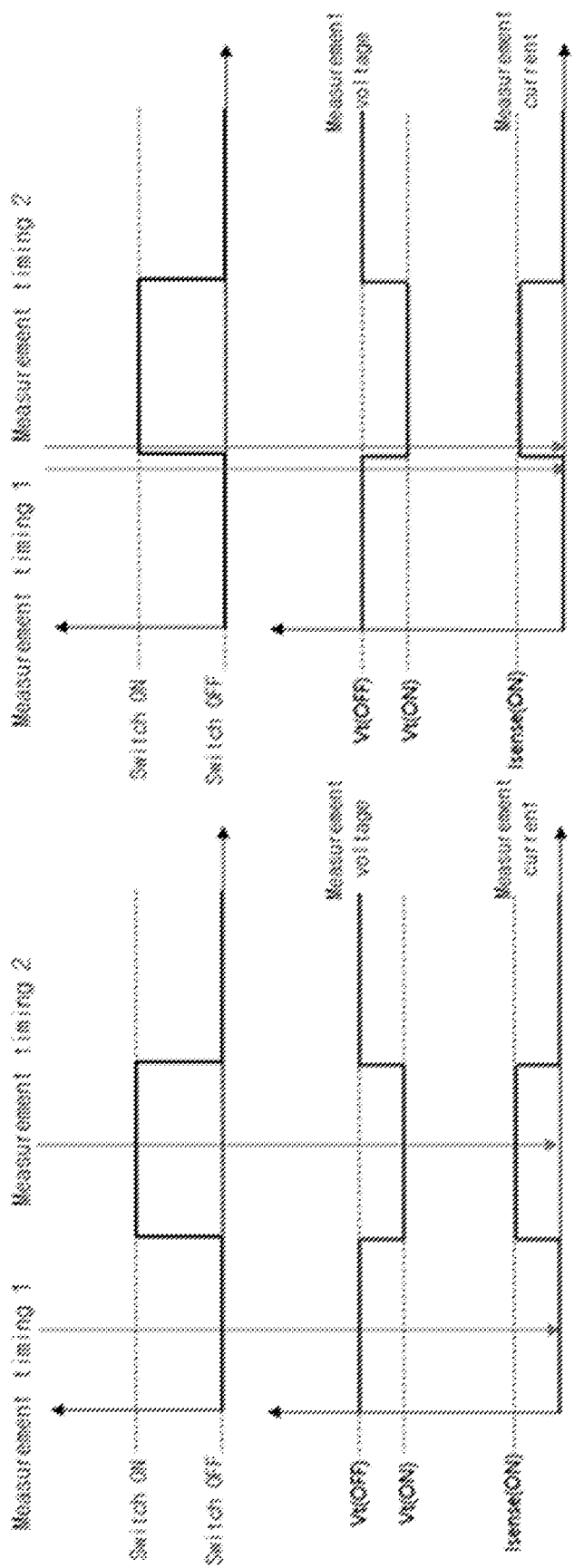
Figure 5:
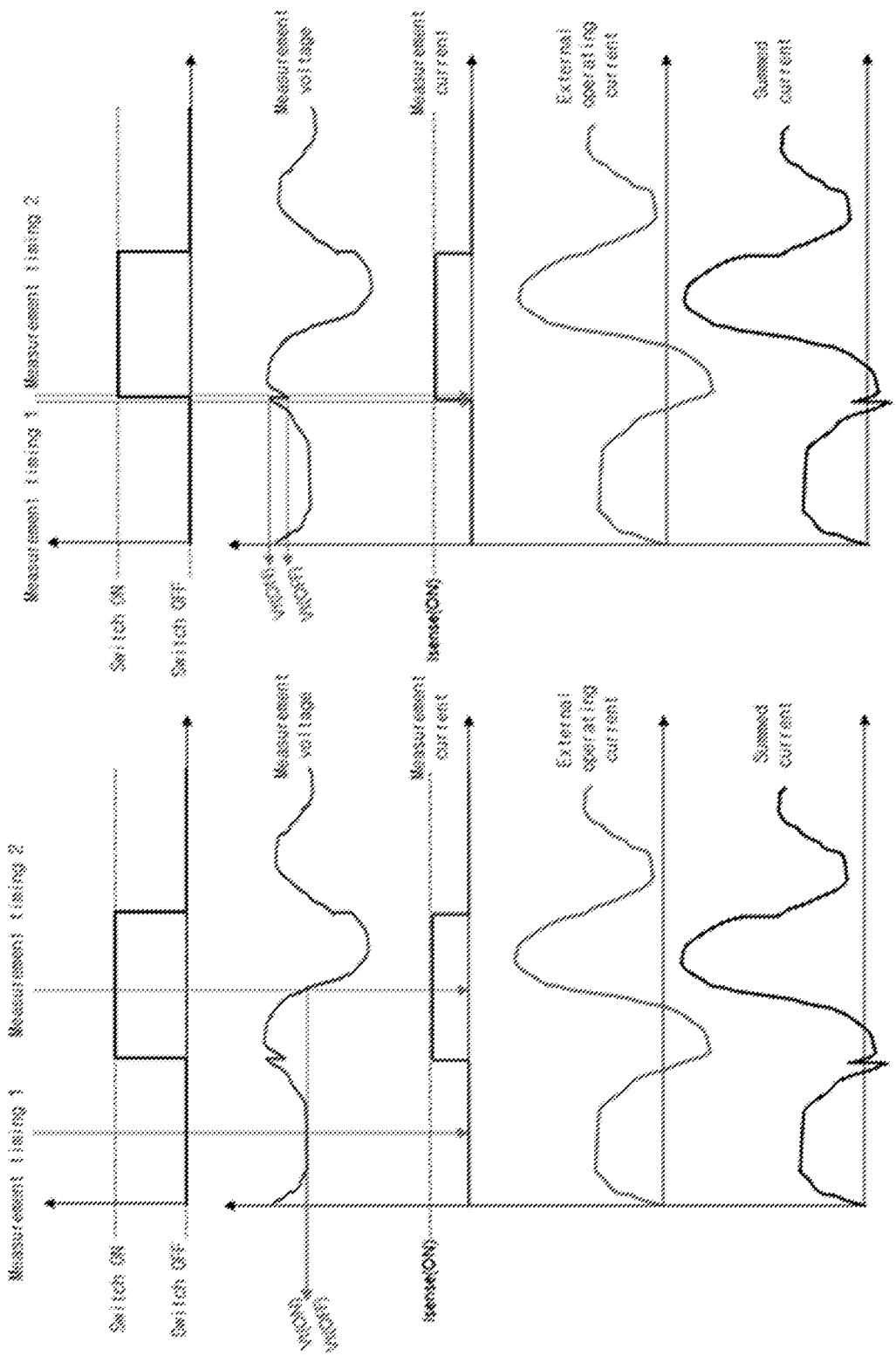

At the outset, the configuration of an apparatus for measuring the internal resistance of battery cells in a variable number unit in an online state according to an embodiment of the present disclosure will be described. FIG. 1 is a diagram illustrating the configuration of an apparatus for measuring the internal resistance of battery cells in a variable number unit in an online state according to an embodiment of the present disclosure. FIGS. 2A and 2B are diagrams illustrating the configuration of a measurement circuit for measuring the internal resistance of a battery cell according to an embodiment of the present disclosure. FIG. 3 is a diagram illustrating the waveform of an operation for measuring the internal resistance of a battery cell according to an embodiment of the present disclosure. FIGS. 4A to 6 are diagrams illustrating the measurement timing for measuring the internal resistance of a battery cell according to an embodiment of the present disclosure. FIGS. 7A to 11 are diagrams illustrating a method of configuring measurement target battery cells according to an embodiment of the present disclosure. FIG. 12 is a diagram illustrating a method of performing cell balancing for a plurality of battery cells according to an embodiment of the present disclosure.

Referring to FIG. 1, an apparatus for measuring the internal resistance of a battery cell according to an embodiment of the present disclosure includes a battery module 100 and a measuring apparatus 200.

The battery module 100 includes a plurality of battery cells. Although the embodiment of the present disclosure is described as measuring the internal resistance of a plurality of battery cells in the battery module 100, those skilled in the art will understand that measuring the internal resistance of the battery module 100 in a battery pack including a plurality of battery modules 100 also falls within the scope of the present disclosure.

As shown in FIG. 1, the measuring apparatus 200 includes a switch array 210, a measurement circuit 220, a switch array controller 230, and a controller 240.

The switch array 210 includes a plurality of switches respectively connected to the plurality of battery cells in the battery module 100. The switch array 210 is for selecting at least one battery cell from among the plurality of battery cells included in the battery module 100 in an online state and connecting the selected battery cell(s) to the measurement circuit 220. The internal resistance of the battery cell(s) selected by the switch array 210 is measured by the measurement circuit 220. Therefore, the battery cell selected by the switch array 210 will be referred to as a measurement target battery cell. That is, the switch array 210 configures the measurement target battery cell by selecting at least one battery cell from among the plurality of battery cells included in the battery module 100 under the control of the switch array controller 230.

The measurement circuit 220 includes a high-speed switch (HS), a variable resistor (VR), and a measurement sensor (MS). FIGS. 2A and 2B show a detailed configuration of the measurement circuit 220 for measuring the battery internal resistance. FIG. 2A shows functional blocks of the measurement circuit 220, and FIG. 2B shows the circuit configuration of the measurement circuit 220. FIGS. 2A and 2B show a state in which the measurement target battery cell (MT) and the measurement circuit 220 are electrically connected.

The variable resistor (VR, R_Sense) is a resistance having a variable or fixed value. The high-speed switch (HS) rapidly switches (ON/OFF) the connection between the measurement target battery cell (MT) and the variable resistor (VR). When the high-speed switch (HS) is turned on, an internal resistor (R_Battery) of the measurement target battery cell (MT) is connected in parallel with the variable resistor (VR, R_Sense), and at least part of energy of the measurement target battery cell (MT) is consumed by the variable resistor (R_Sense). In addition, when the high-speed switch (HS) is turned off, the connection between the internal resistor (R_Battery) of the measurement target battery cell (MT) and the variable resistor (VR, R_Sense) is released.

The measurement sensor (MS) includes a voltage sensor and a current sensor. The measurement sensor (MS) is for detecting a variation in a measurement voltage of the measurement target battery cell (MT) generated when at least part of energy of the measurement target battery cell (MT) is consumed by the variable resistor (R_Sense) depending on the switching (ON/OFF) of the high-speed switch (HS), and for detecting a measurement current flowing in the measurement target battery cell (MT) in the switch-on state of the high-speed switch (HS). FIG. 3 shows the waveform of an operation for measuring the internal resistance (R_Battery) of a battery cell. As shown in FIG. 3, the measurement sensor (MS) detects the measurement voltage variation (ΔVt) of the measurement target battery cell (MT) depending on the switching (ON/OFF) of the high-speed switch (HS) and detects the measurement current (isense) in the switch-on state of the high-speed switch (HS).

Referring to FIGS. 1 to 3, depending on the switching (ON/OFF) of the high-speed switch (HS), the measurement target battery cell (MT) is repeatedly connected to and disconnected from the variable resistor (R_Sense) of the measurement circuit 220. At this time, the controller 240 receives the measurement voltage variation (ΔVt) of the measurement target battery cell (MT) and the measurement current (isense) from the measurement sensor (MS) of the measurement circuit 220, and divides the measurement voltage variation (ΔVt) of the measurement target battery cell (MT) by the measurement current (isense at ON) to calculate the internal resistance (R_Battery) of the measurement target battery cell (MT).

At this time, the measurement circuit 220 may actively vary the value of the variable resistor (R_Sense) under the control of the controller 240. Then, depending on voltage conditions of the measurement target battery cell (MT), the measurement current (isense at ON) varies. Accordingly, the measurement sensitivity can be adjusted.

Meanwhile, FIGS. 4A and 4B show the measurement timing for measuring the internal resistance (R_Battery) of the measurement target battery cell (MT) in an offline state in which the battery module 100 is not electrically connected to a host device (not shown) using the battery module 100. As shown, in the offline state, the internal resistance (R_Battery) can be accurately measured because the measurement voltage variation (ΔVt) and the measurement current (isense) are unchanged regardless of the measurement timing.

FIGS. 5A and 5B show the measurement timing for measuring the internal resistance (R_Battery) of the measurement target battery cell (MT) in an online state in which the battery module 100 is electrically connected to a host device (not shown) using the battery module 100. As shown, in the online state, an operating current flows through the battery module 100 including the measurement target battery cell (MT). In this case, as compared at measurement timings 1 and 2 in FIG. 5A and measurement timings 1 and 2 in FIG. 5B, the calculation result for the measurement voltage variation (ΔVt) is changed depending on the measurement timings.

Figure 6:
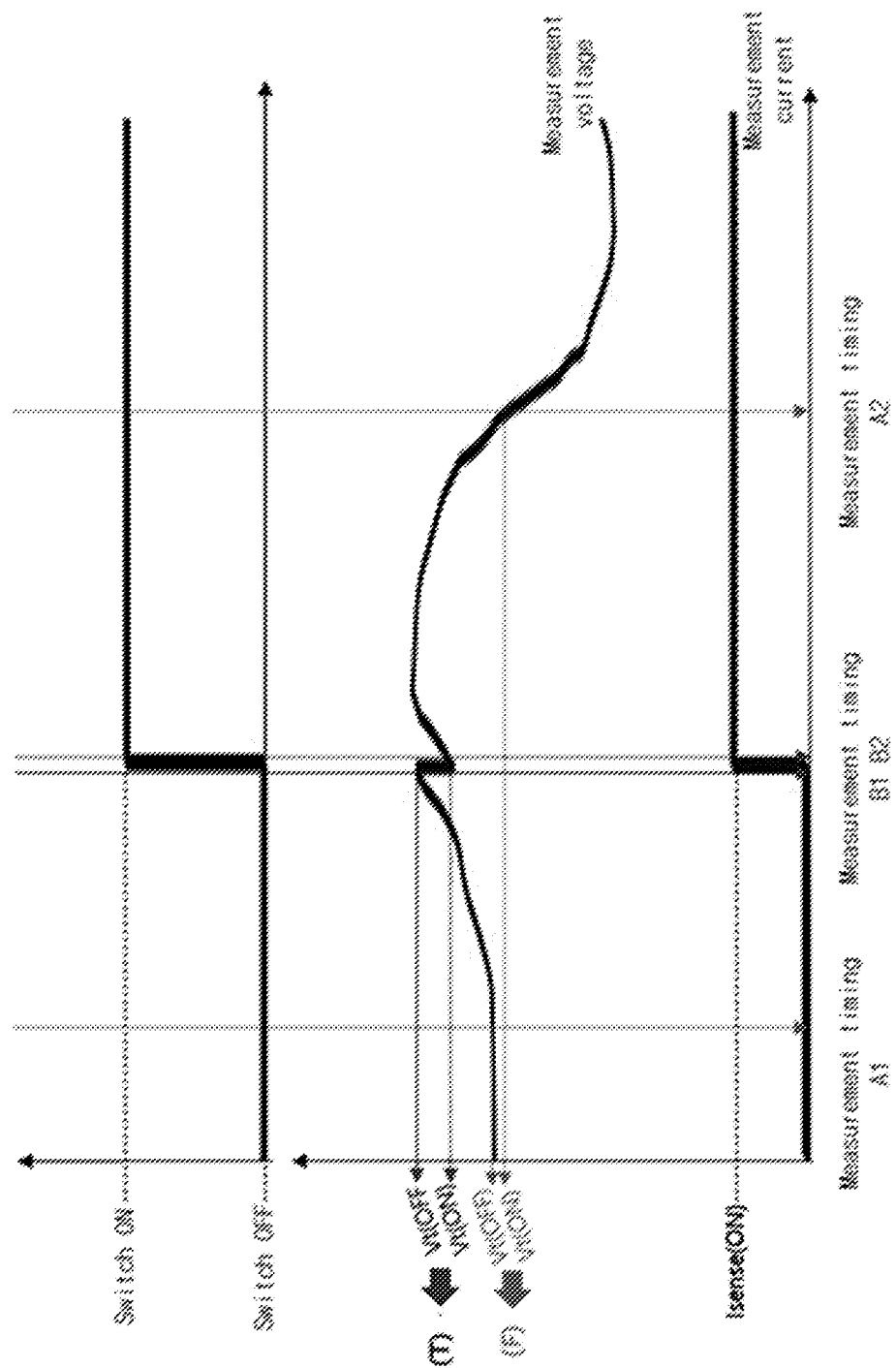
Figures 7A, 7B, 7C, 7D, 7E:
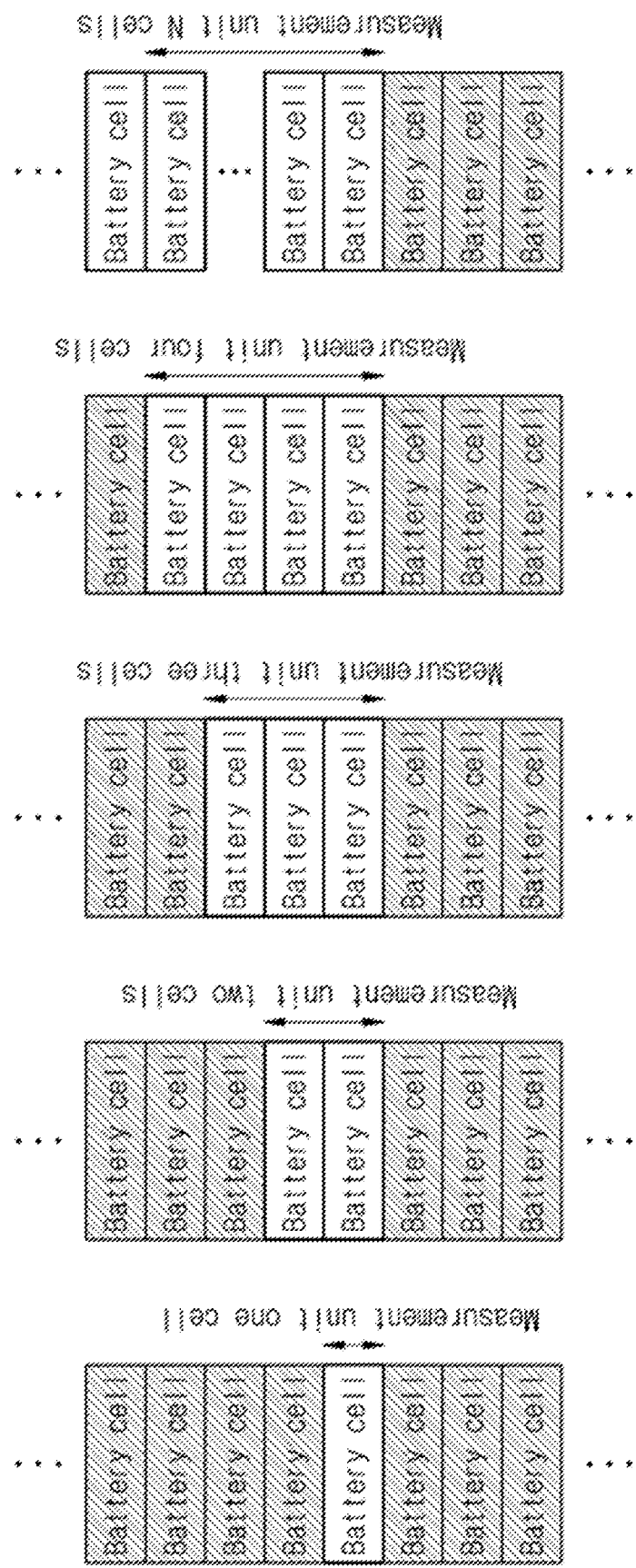

FIG. 6 shows the measurement timing for measuring the internal resistance (R_Battery) of the measurement target battery cell (MT) in the online state of the battery module 100 as in FIGS. 5A and 5B. In the case where a difference between the measurement timing and the timing at which the high-speed switch (HS) changes from the OFF state to the ON state is relatively large, such as measurement timings A1 and A2, an unintended variation (ΔVt, F) in the measurement voltage may be derived. On the other hand, in the case of measurement at timings immediately before and after the timing at which the high-speed switch (HS) changes from the OFF state to the ON state, such as measurement timings B1 and B2, a variation (ΔVt, T) in the measurement voltage may be derived without distortion due to the operating current (working current) of the battery module 100.

In particular, in order to minimize the effect of changes in the operating current (working current) of the battery module 100, a switching time (rising time and falling time) should be minimized upon switching (ON/OFF) the high-speed switch (HS). In addition, a switching frequency of the high-speed switch (HS) should be maximized to minimize the effect of changes in the operating current (working current) of the battery module 100. The present disclosure implements the high-speed switch (HS) as a wide band gap-based ultra-high-speed semiconductor switch to minimize the switching time and maximize the switching frequency. Meanwhile, the measurement circuit 220 may further include an analog-to-digital conversion (ADC) circuit synchronized with ON/OFF control of the high-speed switch (HS). By applying the ADC circuit and using the measured values immediately before and after switching (ON/OFF), it is possible to measure the internal resistance of the battery without distortion due to the operating current (working current) even in the online state.

As described above, the switch array 210 may select at least one of the plurality of battery cells under the control of the switch array controller 230 and configure the measurement target battery cell (MT) that is a target for measuring internal resistance. The switch array controller 230 may enable the switch array 210 to select battery cells in a variable number of measurement units and configure the measurement target battery cell (MT).

FIGS. 7A-7E show examples of configuring the measurement target battery cell (MT) by selecting battery cells in a variable number of measurement units. As shown in FIGS. 7A-7E, the switch array controller 230 may set a unit of measurement when measuring the internal resistance of the battery to 1 to N battery cells. When the battery module 100 includes N battery cells, the switch array controller 230 may set up to N battery cells as a unit of measurement.

FIGS. 8A-8F show an embodiment of selecting the measurement target battery cell (MT) using three battery cells as a unit of measurement. The switch array controller 230 may set three battery cells as a unit of measurement, configure the measurement target battery cell (MT) according to the order in which the battery cells of the battery module 100 are arranged, and measure the internal resistance. According to an embodiment, as shown in FIGS. 8A-8F, the switch array controller 230 may configure the measurement target battery cell (MT) so that the battery cells overlap. For example, in FIG. 8A, the first to third battery cells are configured as the measurement target battery cell (MT), and in FIG. 8B, the second to fourth battery cells are configured as the measurement target battery cell (MT). That is, in the measurement target battery cell (MT) shown in FIGS. 8A and 8B, the second and third battery cells overlap. According to another embodiment, although not shown, the switch array controller 230 may sequentially configure the measurement target battery cell (MT) so that the battery cells do not overlap. Meanwhile, according to still another embodiment, the switch array controller 230 may select battery cells as the measurement target battery cell (MT) in an irregular order. In addition, the switch array controller 230 may differently set the frequency of being selected as the measurement target battery cell (MT) for each battery cell. In this case, the frequency of selecting a specific battery cell expected to have a problem may be increased according to the purpose. As such, the switch array controller 230 may determine the measurement order, which is the order of configuring the measurement target battery cell.

Figure 11:
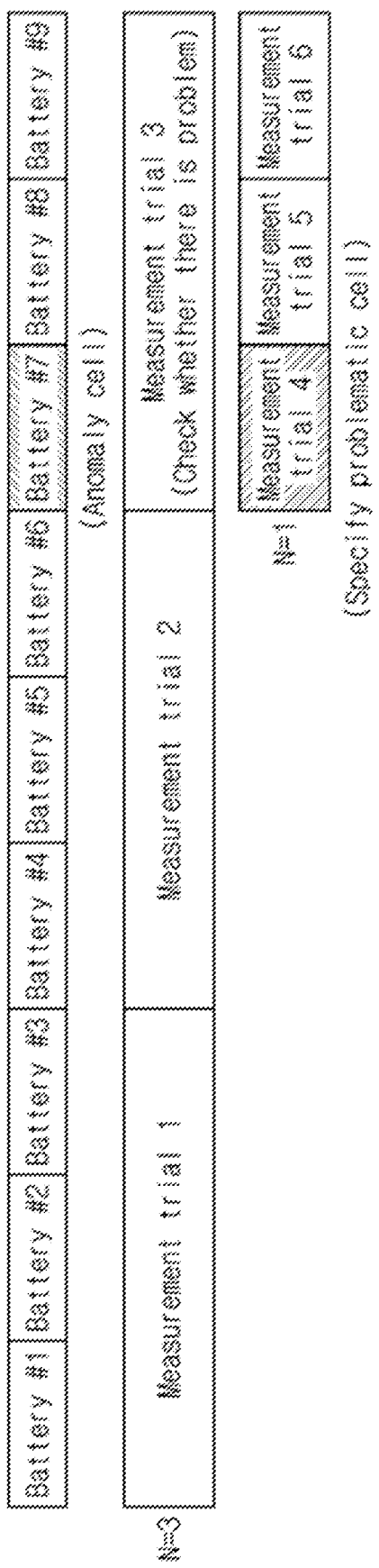
Figure 12:
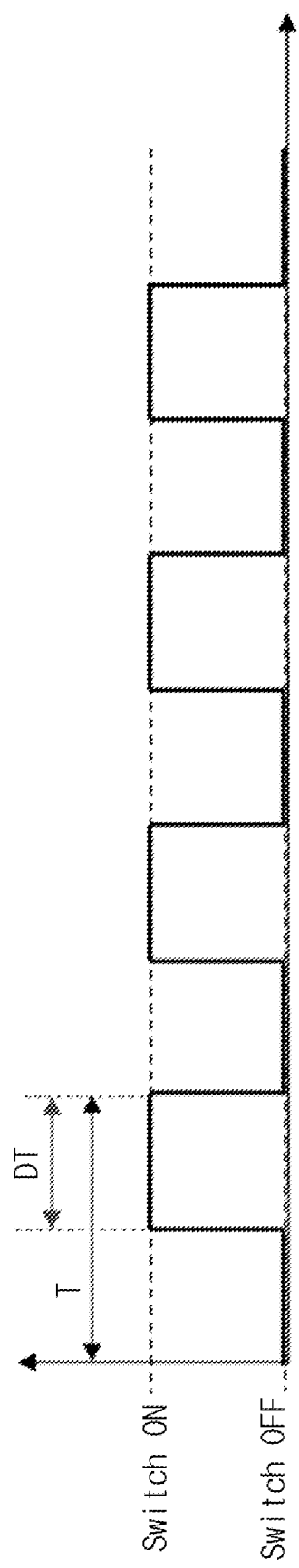
FIG. 12 is a diagram illustrating a method of performing cell balancing for a plurality of battery cells according to an embodiment of the present disclosure.

FIGS. 9 to 11 show examples of measuring the internal resistance by selecting the measurement target battery cell (MT) in different ways. In FIGS. 9 to 11, it is assumed that the battery module 100 includes nine battery cells.

FIG. 9 shows a case in which a unit of measurement is all battery cells included in the battery module 100. In this case, the measurement target battery cell (MT) includes all nine battery cells. Because the internal resistance is measured for all nine battery cells, if any one battery cell (e.g., battery #7) has an abnormality, it is possible to check whether the battery module 100 is abnormal, but it is difficult to specify the battery cell (e.g., battery #7) having an abnormality in the battery module 100.

FIG. 10 shows a case in which a unit of measurement is one battery cell, which is the smallest unit, and the measurement target battery cell (MT) is configured according to the order in which the battery cells are arranged. In this case, the measurement target battery cell (MT) includes only one battery cell. Because the internal resistance is sequentially measured for each battery cell, it is possible to check whether the battery module 100 has an abnormality and to specify a battery cell (e.g., battery #7) having an abnormality. However, depending on the location where the battery cell with the abnormality is disposed, the time required to check whether there is an abnormality and to specify the battery cell with an abnormality may vary.

FIG. 11 assumes that a unit of measurement is variable. As shown, when the measurement is performed from the first time to the third time, the battery internal resistance is measured by configuring the measurement target battery cell (MT) using three battery cells as a unit of measurement. Therefore, when measuring the battery internal resistance for the third time, it is possible to check whether or not there is an abnormality. However, because it is not yet possible to specify a battery cell with an abnormality, when the measurement is performed from the fourth time to the sixth time, a unit of measurement is reduced and the battery internal resistance is measured by configuring the measurement target battery cell (MT) using one battery cell as a unit of measurement. Therefore, when measuring the battery internal resistance for the fourth time, it is possible to specify a battery cell (e.g., battery #7) having an abnormality. As such, unlike the conventional method of measuring the internal resistance of a battery with a fixed configuration, the present disclosure can perform measurement while varying a unit of measurement for the battery cells to be measured. When measuring the battery internal resistance by configuring the measurement target battery cell (MT) through a large unit of measurement, it is possible to quickly detect whether or not the entire battery is abnormal. In this case, if it is found that there is an abnormality, the battery internal resistance is measured by configuring the measurement target battery cell (MT) in a reduced unit of measurement, and thus it is possible to quickly specify a battery cell (e.g., battery #7) with an abnormality.

The controller 240 derives the internal resistance of the measurement target battery cell (MT) through the measurement circuit 220. Specifically, the controller 240 derives the internal resistance of all battery cells in the battery module 100 (e.g., through measurement trials 1 to 3 in FIG. 11) by using a first unit of measurement (e.g., three battery cells in the case of FIG. 11) and then, based on the derived internal resistance, derives the measurement target battery cell (e.g., batteries #7 to #9 in measurement trial 3 in FIG. 11) having an abnormality. Also, the controller 240 notifies the derived measurement target battery cell (e.g., batteries #7 to #9 in measurement trial 3 in FIG. 11) to the switch array controller 230. Then, the switch array controller 230 changes a unit of measurement to a second unit of measurement (e.g., one battery cell in the case of FIG. 11) smaller than the first unit of measurement, and also changes the measurement order (e.g., to measurement trials 4 to 6 in FIG. 11) to measure the measurement target battery cell (e.g., batteries #7 to #9 in measurement trial 3 in FIG. 11) having an abnormality.

Meanwhile, according to an embodiment of the present disclosure, the controller 240 may perform cell balancing for minimizing voltage deviation between cells by controlling the measurement circuit 220 for measuring the internal resistance. FIG. 12 shows the ON/OFF duty ratio (D, Duty) of the high-speed switch for internal resistance measurement. In terms of internal resistance measurement, because it is only necessary to secure the time to measure the voltage immediately before and after the state of the switch changes, the duty ratio (D, Duty) is a meaningless variable if only the minimum ratio is secured. However, as the duty ratio (D, Duty) increases, the energy of the battery consumed by the variable resistor (R_Sense) in the measurement circuit of FIGS. 2A and 2B increases. Therefore, the present disclosure can implement the cell balancing in a way of, when cyclicly measuring the battery internal resistance (R_Battery) in cycles, increasing the duty ratio (D, Duty) in a cell with a higher voltage than the average voltage to discharge energy and lower the voltage, and minimizing the duty ratio (D, Duty) in a cell with a lower voltage than the average voltage to protect energy. At this time, it is also possible to change the value of the variable resistor (R_Sense) to control the amount of discharge.

The controller 240 may measure the average voltage of all battery cells in the battery module 100 through the measurement circuit 222.

According to an embodiment, when the voltage of the measurement target battery cell (MT) is less than the average voltage of the battery module 100, the controller 240 may increase the duty ratio to increase the energy of the battery consumed by the variable resistor (R_Sense). In addition, when the voltage of the measurement target battery cell (MT) is greater than or equal to the average voltage of the battery module 100, the controller 240 may decrease the duty ratio to reduce the energy of the battery consumed by the variable resistor (R_Sense).

According to another embodiment, when the voltage of the measurement target battery cell (MT) is less than the average voltage of the battery module 100, the controller 240 may increase the resistance value of the variable resistor (R_Sense) to increase the energy of the battery consumed by the variable resistor (R_Sense). In addition, when the voltage of the measurement target battery cell (MT) is greater than or equal to the average voltage of the battery module 100, the controller 240 may decrease the resistance value of the variable resistor (R_Sense) to reduce the energy of the battery consumed by the variable resistor (R_Sense).

The present disclosure allows measuring and managing the battery internal resistance, which is closely related to the internal state of the battery, in real time so as to respond to battery safety issues such as first and aging in a wide range of applications where large-capacity batteries are applied, such as various eco-friendly electric vehicles (xEV) powered by electricity or battery energy storage systems (BESS) using electricity as the main energy. According to the present disclosure, the internal resistance of the battery can be measured even when the battery is being used, that is, in an online state. Also, the summed internal resistance of multiple battery cells can be measured at once in a unit of pack or module in order to quickly detect a change in the resistance of the entire battery, and further the internal resistance can be measured in a unit of cells to determine a specific cell that is a problem in a battery composed of many cells.

According to the present disclosure, it is possible to measure the battery internal resistance even when the battery is in operation, i.e., even in the online state. In addition, according to the present disclosure, it is possible to freely and automatically adjust the number of cells used as a unit of measurement ranging from battery cells to modules and packs. Therefore, it is possible to sequentially and quickly check the state of the entire battery in a large unit of cells, and to specify an abnormal battery cell having an abnormally high or low internal resistance by performing a detailed analysis in a small unit of cells. Accordingly, safety accidents such as fire can be prevented in advance by effectively tracking changes in the internal health state of the battery during use of the large-capacity battery. Also, the present disclosure can perform cell balancing by actively measuring and reducing an unbalanced state between battery cells while measuring the internal resistance of the battery. Accordingly, the life of the battery can be increased.

While the specification contains many specific implementation details, these should not be construed as limitations on the scope of any disclosure or of what may be claimed, but rather as descriptions of features that may be specific to particular embodiments of particular disclosures.

Although operations are illustrated as being performed in a predetermined order in the drawings, it should not be construed that the operations are required to be performed sequentially or in the predetermined order, which is illustrated to obtain a preferable result, or that all of the illustrated operations are required to be performed. In some cases, multi-tasking and parallel processing may be advantageous. Also, it should not be construed that the division of various system components are required in all types of implementation. It should be understood that the described program components and systems are generally integrated as a single software product or packaged into a multiple-software product.

This disclosure shows the best mode of the disclosure and provides examples to illustrate the disclosure and to enable a person skilled in the art to make and use the disclosure. The present disclosure is not limited by the specific terms used in the disclosure. Based on the present disclosure, a person skilled in the art can modify, alter, or change the disclosure without departing from the scope of the disclosure.

Accordingly, the scope of the present disclosure should not be limited by embodiments described in the disclosure but should be defined by the appended claims.

What is claimed is:

1. A cell internal resistance online measuring apparatus comprising:
   a switch array configured to configure a measurement target battery cell by selecting at least one battery cell from among a plurality of battery cells included in a battery module;
   a variable resistor connected to the measurement target battery cell via the switch array;
   a high-speed switch configured to switch a connection between the measurement target battery cell and the variable resistor;
   a measurement sensor configured to detect a measurement voltage of the measurement target battery cell and a measurement current of the measurement target battery cell in an online state of the battery module;
   a controller configured to derive an internal resistance of the measurement target battery cell through the measurement voltage and the measurement current; and
   a switch array controller configured to:
      configure the measurement target battery cell by controlling the switch array,
      variably change a unit of measurement indicating the number of selected battery cells upon configuring the measurement target battery cell, and
      determine a measurement order indicating an order of configuring the measurement target battery cell.

2. The apparatus of claim 1, wherein the measurement sensor is configured to detect a variation in the measurement voltage of the measurement target battery cell depending on switching of the high-speed switch and detect the measurement current of the measurement target battery cell in a switch-on state of the high-speed switch, and
   the controller is configured to divide the measurement voltage variation by the measurement current to calculate the internal resistance of the measurement target battery cell.

3. The apparatus of claim 2, wherein the controller is configured to derive, as the measurement voltage variation, a voltage difference of the measurement target battery cell between timings immediately before and immediately after the high-speed switch changes from a switch-off state to the switch-on state.

4. The apparatus of claim 1, wherein the controller is configured to derive the internal resistance of all battery cells in the battery module through the measurement circuit by using a first unit of measurement, and then notify the measurement target battery cell having an abnormality to the switch array controller, and
   wherein the switch array controller is configured to change a unit of measurement to a second unit of measurement smaller than the first unit of measurement, and change a measurement order to measure the measurement target battery cell having an abnormality.

5. The apparatus of claim 1, wherein the controller is configured to measure an average voltage of all battery cells in the battery module,
   in response to a voltage of the measurement target battery cell being less than the average voltage, the controller is configured to increase a duty ratio of the high-speed switch so that battery energy consumed by the variable resistor increases, and
   in response to the voltage of the measurement target battery cell being greater than or equal to the average voltage, the controller is configured to decrease the duty rate of the high-speed switch so that the battery energy consumed by the variable resistor is reduced.

6. The apparatus of claim 1, wherein the controller is configured to measure an average voltage of all battery cells in the battery module,
   in response to a voltage of the measurement target battery cell being less than the average voltage, the controller is configured to increase a resistance value of the variable resistor, and
   in response to the voltage of the measurement target battery cell being greater than or equal to the average voltage, the controller is configured to decrease the resistance value of the variable resistor.

* * * * *